United States Patent [19]

Johnson

[11] Patent Number: 4,958,407
[45] Date of Patent: Sep. 25, 1990

[54] AUXILIARY TOOL HANDLE

[76] Inventor: Samuel V. Johnson, 32 Cherry Tree Rd., Loudonville, N.Y. 12211

[21] Appl. No.: 396,549

[22] Filed: Aug. 21, 1989

Related U.S. Application Data

[63] Continuation-in-part of Ser. No. 200,451, May 31, 1988.

[51] Int. Cl.⁵ ............................................. B25G 1/00
[52] U.S. Cl. .................................. 16/114 R; 16/125; 16/DIG. 25; 81/491; 294/58
[58] Field of Search .............. 16/110 R, 114 R, 119, 16/125, 127, DIG. 19, DIG. 41, 111 A, 111 R, 110.5, DIG. 25; 74/554, 555.1, 557, 551.8, 557, 551.9; 81/177.1, 177.3, 489, 491; 273/75, 81.2, 81 R, 165; 294/57, 58

[56] References Cited

U.S. PATENT DOCUMENTS

| | | | |
|---|---|---|---|
| 758,482 | 4/1904 | Smith | 294/58 |
| 855,016 | 5/1907 | Orthwein | 273/165 |
| 933,647 | 9/1909 | Hunt | 294/58 |
| 2,011,896 | 8/1935 | Grace | 294/58 |
| 2,158,277 | 5/1939 | Dolph | 16/110 R |
| 2,482,589 | 9/1949 | Maguire | 16/110 R |
| 2,938,728 | 5/1960 | Green | 273/165 |
| 3,014,750 | 12/1961 | Briggs | 294/58 |
| 3,044,186 | 7/1962 | Berger | 16/110 R |
| 3,466,078 | 9/1969 | Sholund | 294/58 |
| 4,229,033 | 10/1980 | Vosbikian | 16/110 R |
| 4,690,447 | 9/1987 | Adams | 294/58 |
| 4,701,142 | 10/1987 | Merritt | 294/58 |

FOREIGN PATENT DOCUMENTS

| | | | |
|---|---|---|---|
| 6842 | of 1888 | United Kingdom | 16/119 |
| 213175 | 3/1924 | United Kingdom | 16/125 |

Primary Examiner—Richard K. Seidel
Assistant Examiner—Edward A. Brown
Attorney, Agent, or Firm—Schmeiser, Morelle & Watts

[57] ABSTRACT

An auxiliary tool handle (10) for attachment to cylindrical tool handles (12), such as those used for garden rakes, hoes, push brooms and the like. The auxiliary tool handle (10) comprises at least one curvilinear handle segment (16, 20) for removable and adjustable mounting on a conventional tool handle. Sleeves (18) for slidable mounting of the handle segments on conventional cylindrical tool handles are attached to the handle segments (16, 20), thereby enabling adjustable mounting thereof about the circumference and along the length of the tool handle.

20 Claims, 6 Drawing Sheets

FIG. 10
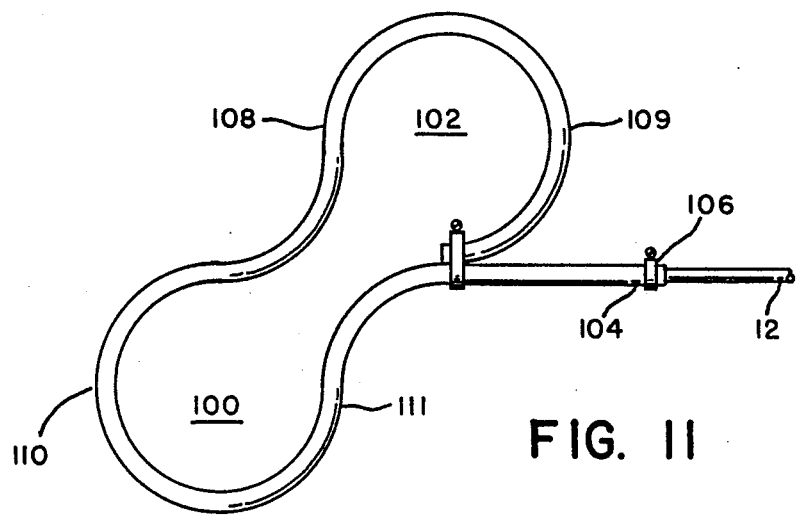
FIG. 11

AUXILIARY TOOL HANDLE

This application is a continuation-in-part of application 07/200,451, filed 5/31/88.

FIELD OF THE INVENTION

The present invention relates generally to tool handles. More particularly, this invention is an auxiliary handle for attachment to conventional tools, such as garden rakes, hoes, push-pull brooms and the like.

BACKGROUND OF THE INVENTION

When doing work in a yard or garden, it is often necessary to use tools, such as rakes, shovels or hoes, which require great physical exertion in order to be effective. The bending and pulling necessary to use tools with long, straight handles results in stress and strain to the back and arms, as well as to other body parts, depending upon the work involved and the individual's method of tool employment. The strain can be especially harmful to those who use the above described tools only a few times yearly, and thus are not conditioned for such exertion. Even for those who use long-handled tools regularly, the strain involved cannot be endured for extended periods of time; thus, efficiency is impaired.

Still another problem associated with the use of tools of the type described above is the frequent occurrence of hand blisters, due to the pressure necessarily applied to the handle as strokes are taken.

The present inventor has developed an auxiliary tool handle for use on conventional rakes and the like which reduces the strain on the user, thereby allowing the user to accomplish more work without experiencing potentially severe and harmful body pain or blisters. The present invention is not only safe to use, but is easily and conveniently attachable to conventional tool handles.

The major advantages of the invention are set forth in part herein and in part will be obvious herefrom, or may be learned by practice with the invention, the same being realized and attained by means of the instrumentalities and combinations pointed out in the appended claims.

SUMMARY OF THE INVENTION

The present invention is an auxiliary handle for tools, such as rakes, hoes, hand tools and push brooms which have one or more straight, cylindrical handles. The invention comprises curvilinear handle segments which are removably and slidably mountable at variable positions along the length and about the circumference of the tool handle. In one embodiment, the auxiliary handle comprises a continuous, circular handle member with a number of radial handle members likewise provided for gripping. Alternate embodiments include at least one semi-circular handle segment added to the tool handle. When a plurality of segments are used, they may be opposite each other or staggered at variable positions along the tool handle. The semi-circular handle segments may be in the form of loops.

The auxiliary handle may be affixed to at least one sleeve for encircling a portion of the tool handle and further includes means for removable and adjustable mounting thereon.

This invention is most effective in reducing the strain experienced with common straight handled tools. In particular, the user may grip the handle at any point along the curvilinear surface to achieve a stronger, but more comfortable grip. Often this will involve gripping the handle at an angle suitable for achieving a grip where the fingers, prior to closing, are substantially perpendicular to the portion of the handle to be gripped, with the arm also being substantially perpendicular to said gripped portion. This is similar to the type of grip one achieves when climbing a ladder, where the force against the fingers is what we will call a forward force directed against the opening of the fingers, and keeping the fingers from opening maintains the grip. This grip may be contrasted to the straight handled tool grip which is similar to the grip used in rope climbing. With this latter grip the force is what we will call a sideways force, directed toward sliding the rope, or straight handle, sideways through the hand. Maintaining this type of grip requires much more exertion and strength and is of course more likely to produce blisters and cramps. The sideways force also puts a great deal of strain on the forearm muscles, which strain greatly reduced when the forearm is perpendicular to the handle.

Furthermore, for effectiveness, most tools are used at different angles to the work surface. For example, the difference in the angle between raking leaves in the yard as opposed to raking under a bush. Bending over while working causes a great deal of back strain which is a common, and serious ailment experienced by a large portion of the population. In the subject invention, since the curvilinear surfaces move away from the straight handle it is possible, and convenient, to change ones grip, thereby lowering the straight handle without bending over. Also, the curvilinear handle allows the user to change the various angles of the grip thereby altering the muscles being used and the type of force on these muscles. This variety results in greater endurance without over exerting any particular muscle.

The invention consists in the novel parts, constructions, combinations and improvements herein shown and described. The accompanying drawings referred to herein and constituting a part hereof illustrate preferred embodiments of the invention and together with the description, serve to explain the principles of the invention.

BRIEF DESCRIPTION OF THE DRAWINGS

Of the Drawings:

FIG. 10 shows a profile view of a double loop handle on a push broom.

FIG. 11 shows an elevation view of a third alternative double loop auxiliary handle.

DETAILED DESCRIPTION OF THE DRAWINGS

With reference to FIGS. 1 through 5, three alternate embodiments of the auxiliary tool handle constructed in accordance with the present invention are shown. As illustrated, the auxiliary tool handle, generally designated by the numeral 10, is removably attached to a conventional, cylindrical tool handle 12. Generally, the auxiliary tool handle 10 of the present invention comprises at least one curvilinear handle segment and adjustable mounting means enabling the user to vary the position of the handle segments about the circumference and along the length of the cylindrical tool handle 12. The auxiliary handle 10 may be made of a variety of materials including plastic, metal, or rubber.

Figure 1:
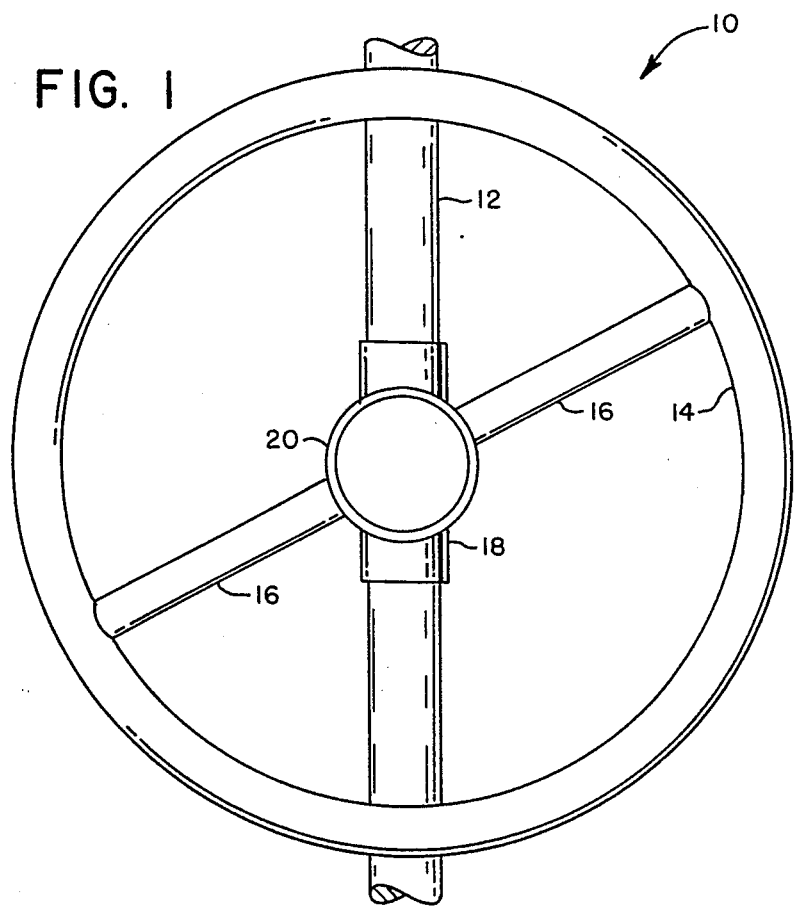
FIG. 1 is a front elevation of the auxiliary tool handle constructed in accordance with the preferred embodiment of the present invention.
Figure 2:
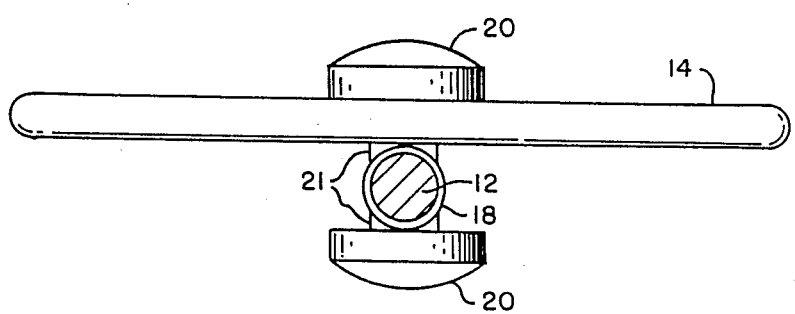
FIG. 2 is a top view of the auxiliary tool handle of FIG. 1, illustrating one mode of adjustable fastening.

In the preferred embodiment of FIGS. 1 and 2, the curvilinear handle segments comprise a continuous, circular handle member 14 and radial handle member 16 for additional gripping means. With the auxiliary tool handle 10 of the preferred embodiment securely in place, the user is thus able to maneuver the tool by grasping the auxiliary handle 10 at any position along the circular handle member 14 and further along the radial handle members 16.

To secure the auxiliary handle 10 to the cylindrical tool handle 12, a sleeve 18 for receiving the tool handle 12 is affixed to the curvilinear handle segments by any appropriate adjustable fastening method, depending upon the materials used to manufacture the auxiliary handle 10 and the sleeve 18. In the preferred embodiment of FIGS. 1 and 2, hubs 20 and brackets 21 are secured by bolts (not shown) extending through the tool handle 12. Alternatively, a clamp may be used to secure the sleeve 18 to the tool handle 10 by bolting the clamp thereto. It is to be understood that any other suitable method of adjustably securing the sleeve 18 to the tool handle 12 may be employed.

Figure 3:
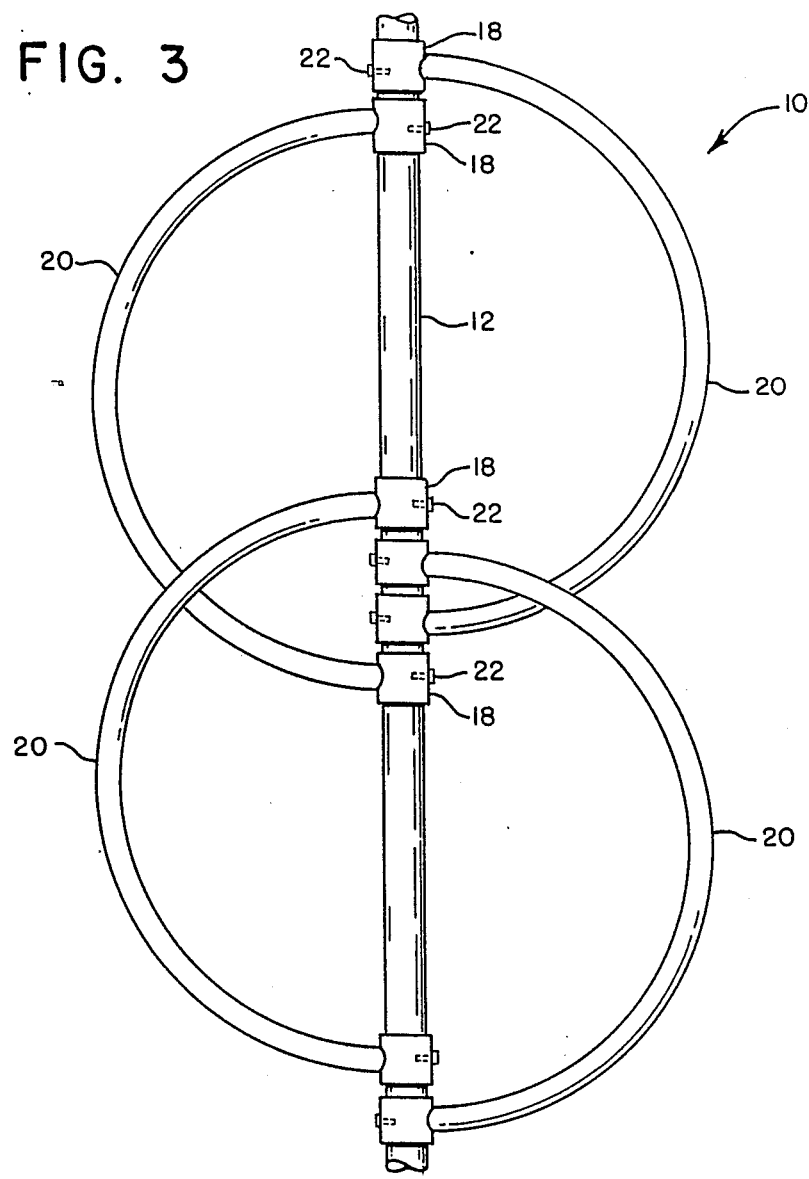
FIG. 3 is an alternate embodiment of the auxiliary tool handle of the present invention.
Figure 4:
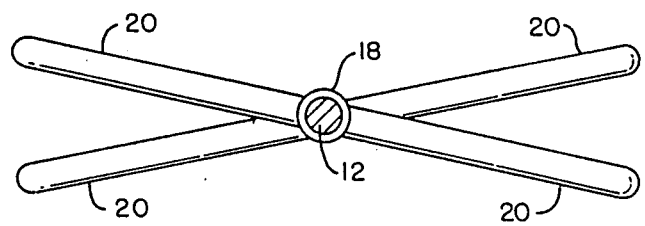
FIG. 4 is a top view of the alternate embodiment of FIG. 3.

With reference to FIGS. 3 and 4, a first alternate embodiment of the auxiliary tool handle 10 of the present invention is shown. In this version, a variable number of semicircular handle segments 20 are staggered along the tool handle 12. Although either of the above described methods of fastening the sleeve 18 to the tool handle 12 may be employed, set screws 22 are used here to illustrate yet another fastening method.

Figure 5:
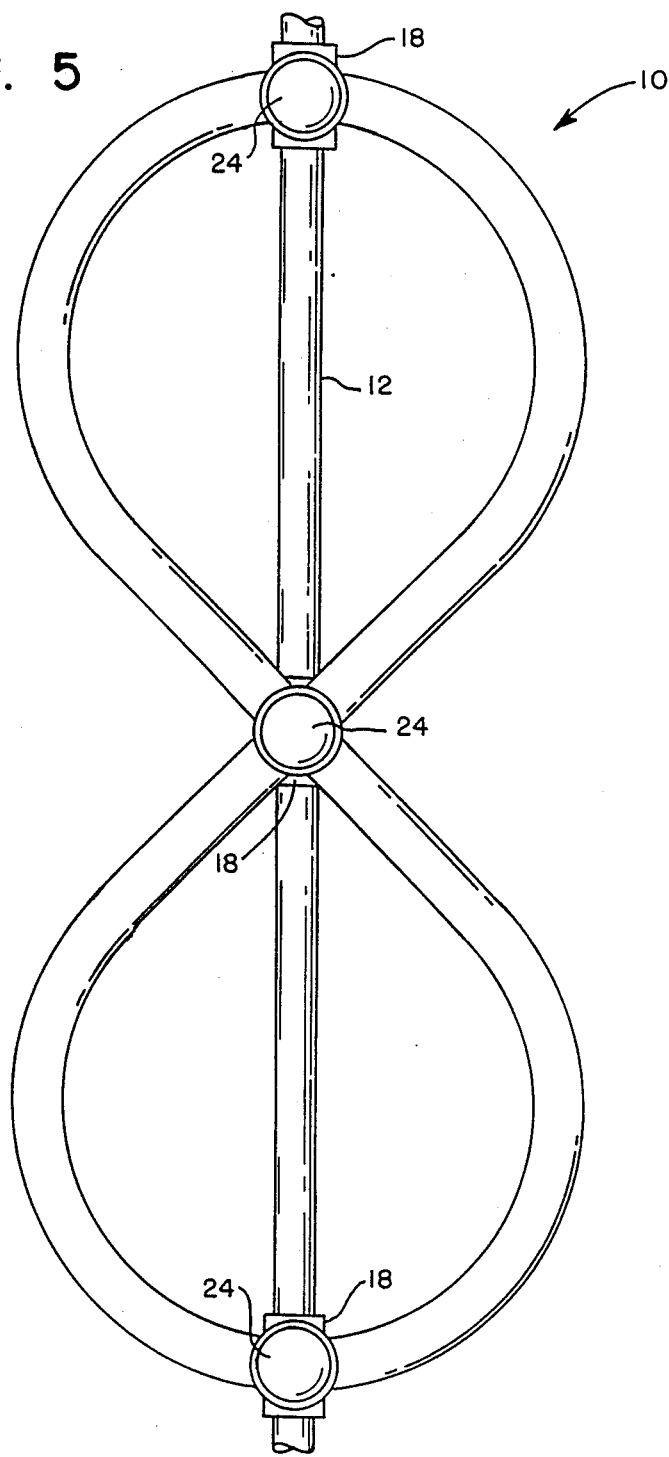
FIG. 5 is still another alternate embodiment of the auxiliary tool handle constructed in accordance with the present invention.

A second alternative embodiment of the present invention is depicted in FIG. 5. In this embodiment, curvilinear handle segments mounted on sleeves 18 are joined to form an auxiliary handle 10 having a figure-eight configuration. Hubs 24 and brackets (not shown) are bolted to the tool handle 10, thereby functioning as the adjustable fasteners in FIG. 3, but any suitable method may be employed as hereinabove described.

Figure 6:
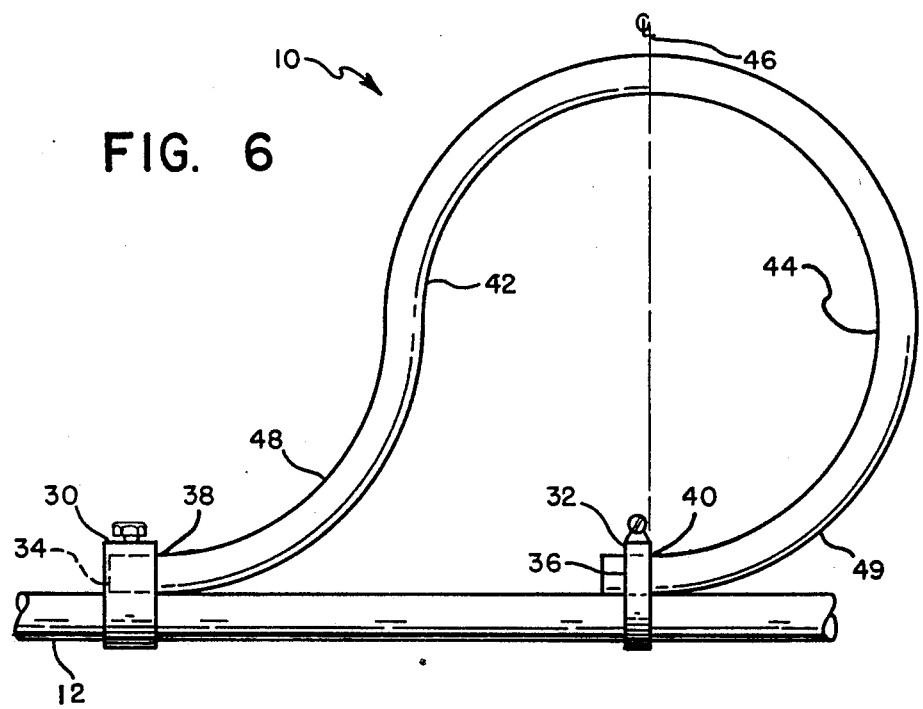
FIG. 6 is an elevation view of a single loop shaped auxiliary handle.

Another alternative embodiment of the present invention is depicted in FIG. 6. In this embodiment, the curvilinear handle segment is in the form of a loop clamped to the handle 12 by clamps 30 and 32. The clamps are attached at loop mounting points 34 and 36 which are located in portions 38 and 40 that are parallel to the axis of the main handle 12. Two portions of the loop, 42 and 44 are perpendicular to the mounting portions and a user could grasp these portions with his or her hands and apply force to the tool. The loop diameter is sized to receive at least four of a user's fingers and is on the order of six to 14 inches. The loop portions 42 and 44 are of sufficient length so that an average person could wrap four fingers around either portion.

These portions would preferentially be at least 2 ½ inches long. The horizontal distance from the forward mounting point 34 to an axis 46 through the center of the loop perpendicular to the handle is a minimum of about 8" so that there is sufficient spacing from the mounting point 34 to the perpendicular portion 42 to allow the user to grasp the perpendicular portion without interference from any mounting clamp or fastener. It is noted that portion 48 of the loop is at an angle of at least 45 degrees relative to portion 34 to provide a rapid transition from the parallel portion to the top of the loop. Preferably, the transition will reach 90 degrees relative to the handle. However, a 45 degree side will provide sufficient area for functionality. It is also pointed out that when the material used to fabricate the loop includes some flexibility, the loop would flex at the transition points 48 and 49 thereby providing a slight cushioning effect. The interior of the loop forms a plane which is parallel to the longitudinal axis of the main handle. In the preferred configuration, this plane would be perpendicular to the tool head, as seen in FIG. 10.

Figure 7:
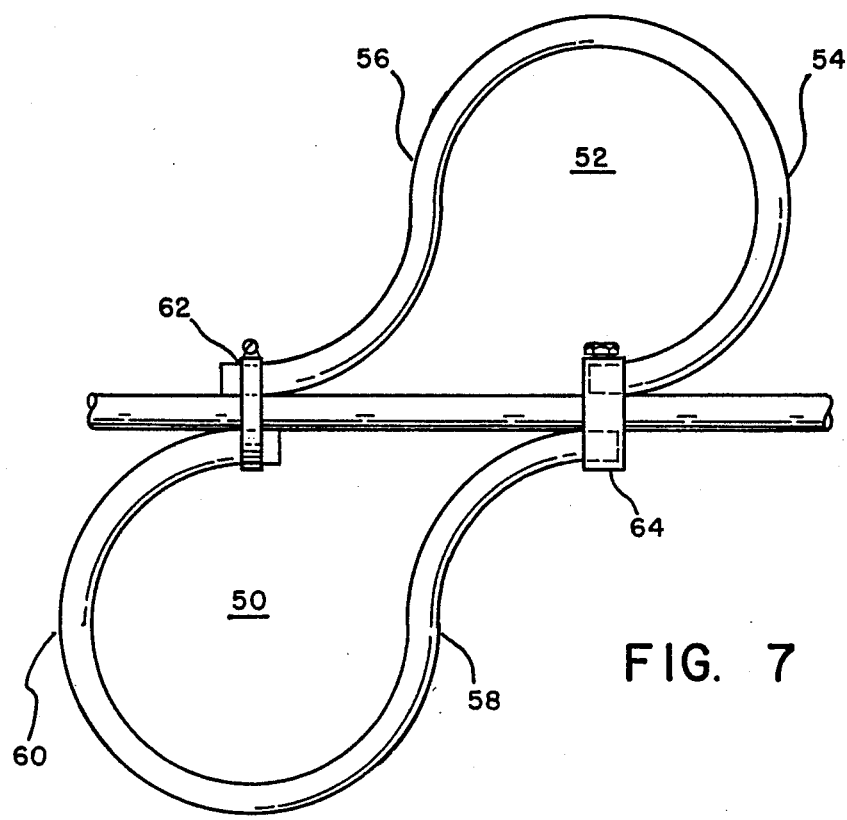
FIG. 7 is an elevation view of a double loop auxiliary handle.

FIG. 7 shows another embodiment in which two loops 50 and 52 are used with the loop centers staggered relative to the longitudinal axis of the handle. In this configuration, the loops form a stylized FIG. 8 shape. In this embodiment, it is envisioned that a user would grasp the handles primarily at any of the perpendicular portions 54, 56, 58 or 60. Clamps or locking sleeves 62 and 64 would attach the loops to the main handle. In a preferred usage, the loops would be coplanar and perpendicular to the tool axis as shown in FIG. 10.

Figure 8:
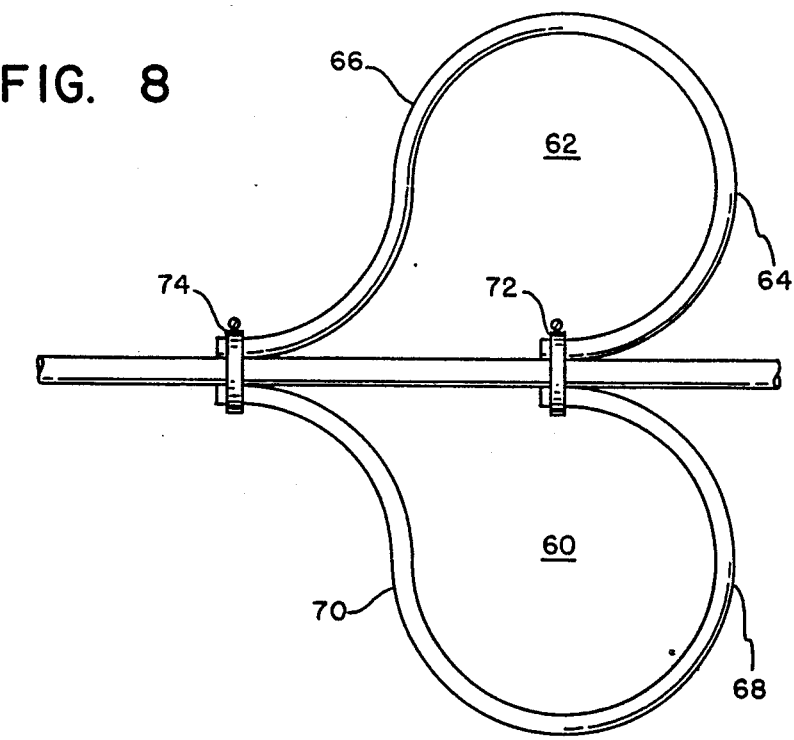
FIG. 8 is an elevation view of a first alternative double loop auxiliary handle.

FIG. 8 shows another embodiment in which two loops 60 and 62 are shown side to side in a heart shape. The user could grasp preferentially any of portions 64, 66, 68 or 70. In this embodiment, as few as two clamps or locking sleeves 72, 74 could be used to attach the loops to the main handle. Again, it is preferred that the loops be coplanar and also, perpendicular relative to the tool axis.

Figure 9:
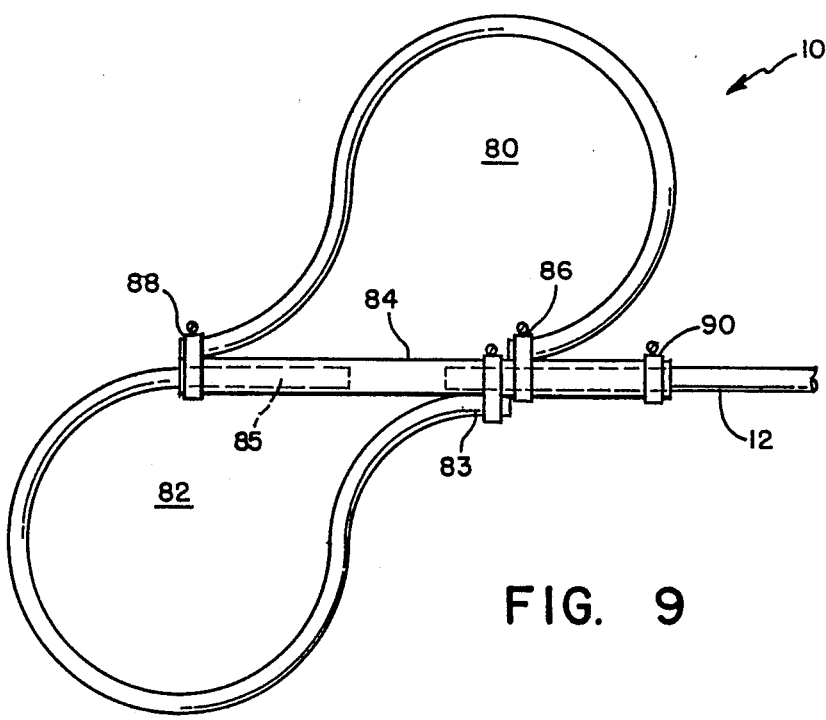
FIG. 9 is an elevation view of second alternative double loop auxiliary handle.

FIG. 9 shows another embodiment of an auxiliary handle in which two loops 80 and 82 are used and form a stylized FIG. 8 shape. A central sleeve 84 is used to which loop 80 is movably attached. Loop 82 has a portion 83 that is movably secured to the exterior of the sleeve and a portion 85 that is telescopically received within the sleeve. This allows loop 82 to telescopically be adjusted relative to the sleeve. Loop 80 is movably attached to the sleeve by clamps or similar fasteners 86, 88. The central sleeve is telescopically, and thereby adjustably mounted to the handle 12 by a clamp 90 or other conventional fastener.

FIG. 10 shows a two loop auxiliary handle having a stylized figure eight shape mounted on a long handled pushbroom 94. This embodiment is similar to that shown in FIG. 7 except 4 clamps are used and the loop spacing is increased. The axis 95 through the head of the broom 96 is perpendicular to the plane of the loops.

FIG. 11 shows another embodiment of a double loop auxiliary handle. In the figure, two loops 100 and 102 are fashioned from a continuous length of material and together form a stylized figure eight shape. An end 104 slidably receives the end of a tool handle 12. A clamp 106 locks the end 104 to the handle 12. The two loops, 100 and 102 are both in the same general form as the loop shown in FIG. 6. In the loops of FIG. 11, as in many of the other embodiments of the instant invention, force is best applied to portions of the loops that are perpendicular to the longitudinal axis of the tool handle. An advantage of the invention readily apparent in this embodiment is the ability to raise and lower the tool head by applying forces in opposite directions to a forward perpendicular portion of the auxiliary handle, for example 108 or 109, and to a rearward portion, for example 110 or 111. This causes the tool head to pivot about a point proximate the auxiliary handle.

In each of the configurations there are at least two segments of the curvilinear handle which are substantially perpendicular to the straight handle. These segments are separated from each other either by the straight handle or by being located in a spaced apart relationship to each other. In either configuration the user may grasp the curvilinear handle on or toward each of the perpendicular segments. In the loop configurations of FIGS. 6-11, the top of the loop, while preferentially included, is not required for a minimal functioning of the auxiliary handle. Preferably, each end of the curvilinear handles of FIGS. 1-5 intersects or is secured to the straight handle at substantially a ninety degree (90°) angle. Also, in my preferred embodiment, there are two curvilinear handle sections each of which intersect the straight handle at ninety degrees. These curvilinear sections may be secured to each other as shown in FIGS. 1 and 5 or may be separated as shown in FIG. 3. More descriptively, the two curvilinear segments could be described as a sine Wave where the center or "0" Zero line is the straight handle. Furthermore, if one were to divide the sine wave into its positive segment and negative segment, and these segments were separately rotatable and slidable along the zero line one could achieve a variety of configurations, each of which embodies the principles of this invention.

The mounting methods for the embodiments shown in FIGS. 6-11 are similar to those used in the embodiments of FIGS. 1-5. These would comprise: mounting the loop(s) to a sleeve or sleeves which would fit over the elongated tool handle, fastening the loop(s) or sleeve(s) to the handle with clamps, bolts, pivotable pins, wedges, pins and detents, etc. Additionally, the loops can be mounted to the elongated handle by passing the handle through the bottom portions of the loop(s) that are adjacent to the handle. To accomplish this, the loop bottom portions would be tubular and have a greater diameter than the tool handle. Outlet holes would be incorporated at the rear portions of the loop bottom portions thereby allowing the handle to exit from the base of the loops. Standard fasteners would then slidably hold the loop(s) in place on the handle. Some of the above methods are shown in the drawings. However, all the above methods and similar methods would be available to one of ordinary skill in the art.

Where the tool is a rake or a shovel, portions of the curvilinear handle would intersect the plane in which the tool resides. This may be contrasted to the configuration where a portion of the handle is perpendicular to the straight handle but parallel to the plane of the tool. This latter configuration is found with shovels having straight handles which are bifurcated at one end, with a connecting handle between said bifurcations. Although grasping the connecting handle is easier, the arm must be rotated from its natural position, and no benefit is gained regarding the need of the user to bend over.

In use, the auxiliary tool handle 10 of the present invention allows the user to accomplish the same work as if a conventional tool handle 12 had been used, but more efficiently and without the bending and further straining associated with such tools. In particular, curvilinear auxiliary handle segments at variable positions along the conventional tool handle 12 allow the user to vary his position about the tool with respect to the handle 12 while working. As a result, the user is able to assume more comfortable and varied working positions, thus avoiding painful physical side effects, including back, arm, and leg strain. The occurrence of hand blisters is likewise reduced due to the decrease in amount of pressure needed to be applied to the handle and the consequential reduction in work time. In contrast, conventional tool handles by themselves have practical utility only when the user stands rearwardly of the tool handle and repeatedly bends at the waist while stretching forward and backward in addition to bearing down on the tool.

The invention in its broader aspects is not limited to the specific embodiments herein shown and described, but departures may be made therefrom within the scope of the accompanying claims, without departing from the principles of the invention and without sacrificing its chief advantages.

What is claimed is:

1. An auxiliary tool handle for attaching to an elongated tool handle comprising:

a plurality of loop shaped member sized to receive at least 4 of a user's fingers said members having a first end and a second end, said ends being capable of adjoining the elongated tool handle, a handle attachment means at each of said ends capable of releasably securing each of said members to the elongated tool handle, said first and second ends of each of said members extending substantially parallel to the elongated tool handle when said member is attached to said handle said first end extending away from an area bounded by the perimeter of said member and said second end extending to form a lower boundary for said area bounded by the perimeter of said member.

2. The deVice of claim 1 having two loop members wherein both ends of one member attach to the handle by a single sleeve, one of the ends of the other member is also removably attached to the sleeve and thereby to the handle, and the other end of the member telescopically fits within the sleeve and the sleeve telescopically fits onto the handle and is slidably secured thereto by a fastening means.

3. The device of claim 1 wherein two loop members are interconnected at their attachment means.

4. The device of claim 1 wherein two loop members together form a heart shape.

5. The device of claim 4 wherein the two loop members lie substantially in the same plane.

6. The device of claim 1 wherein two loop members together form a stylized FIG. 8 shape.

7. The device of claim 6 wherein the two loop members lie substantially in the same plane.

8. The device of claim 1 wherein the diameter of each of said members is at least six inches.

9. A handle for a tool comprising:

an elongated central member which attached to a head of the tool at one end, said central member having a longitudinal axis, at least one loop shaped member, said loop shaped member having a first end and a second end, an attachment means at each of said first and second ends for attaching said loop member to said elongated central member, said first end of said loop member extending substantially parallel to said elongated member and away from an area bounded by the perimeter of said loop member, said second end of said loop member extending substantially parallel to said elongated member and also acting as a lower boundary for said area bounded by the perimeter of said loop member, and said loop shaped member having a rear portion, top portion, and front portion with said top portion being spaced form said central member whereby the distance from the top portion of the loop shaped member to the central member is such that a user can place four fingers within the loop and encircle in a manner substantially perpendicular to the longitudinal axis of the central member either of the front or rear loop member portions.

10. The handle of claim 9 wherein said loop member lies substantially in a single plane, said plane being parallel to the longitudinal axis of said elongated central member.

11. The device of claim 9 wherein said loop member has forward portion and a rearward portion, said forward and rearward portions are substantially parallel to each other and are substantially perpendicular to the longitudinal axis of said elongated central member.

12. The handle of claim 9 wherein the loop member lies substantially in a single plane and the tool has an axis perpendicular to the longitudinal axis of the central member, said axis being substantially perpendicular to the plane of the loop.

13. A handle for a tool comprising:

an elongated central member which attached to a tool at one end, at least two loop shaped members each sized to receive at least four of a user's fingers, each of said loop shaped member shaving a first end and a second end, an attachment means at each of said first and second ends for attaching each of said loop members to said elongated central member, said first end of each of said loop members extending substantially parallel to said elongated member and away from an area bounded by the perimeter of the loop member, and said second end of each of said loop members extending substantially parallel to said elongated member and also acting as a lower boundary for said area bounded by the perimeter of the loop member.

14. The handle of claim 13 wherein two of said loop members together form a heart shape.

15. The handle of claim 13 wherein two of said loop members together form a stylized FIG. 8 shape.

16. The handle of claim 14 wherein the two loop members which form a heart shape lie in the same plane.

17. The handle of claim 15 wherein the two loop members which form a stylized FIG. 8 shape lie in the same plane.

18. A tool handle comprising:

an elongated central member which attaches to a tool at one end;

a plurality of loop shaped members each sized to receive a plurality of a user's fingers, each of said members having a first end and a second end, said ends adjoining said elongated central member a handle attachment means at each end of said loop shaped members capable of releasably securing each member to said elongated central member wherein at least two of said loop shaped members lie in nonparallel planes.

19. The handle of claim 18 wherein an end of one loop lies between the two ends of another loop.

20. A handle for a tool comprising:

an elongated central member which attaches to a tool at one end, a stylized figure eight shaped loop member slidably attached to the central member at the central member's other end, said loop member including a first portion that receives said other end of the central member, said loop member including a second portion that attaches to said first portion, and said loop member including a top loop portion and a bottom loop portion wherein said top loop portion has a center above a longitudinal axis of said central member and said bottom loop portion has a center below the longitudinal axis of said central member.

* * * * *